(12) United States Patent
Kim (10) Patent No.: US 10,742,109 B2
(45) Date of Patent: Aug. 11, 2020

(54) CONTROLLING A QR FLYBACK CONVERTER

(71) Applicant: Infineon Technologies Austria AG, Villach (AT)

(72) Inventor: Tae Yong Kim, Singapore (SG)

(73) Assignee: Infineon Technologies Austria AG, Villach (AT)

( * ) Notice: Subject to any disclaimer, the term of this patent is extended or adjusted under 35 U.S.C. 154(b) by 0 days.

(21) Appl. No.: 16/287,818

(22) Filed: Feb. 27, 2019

(65) Prior Publication Data
US 2019/0280585 A1   Sep. 12, 2019

(30) Foreign Application Priority Data

Mar. 6, 2018   (DE) .......... 10 2018 105 055

(51) Int. Cl.
*H02M 3/335*   (2006.01)
*H02M 1/08*   (2006.01)
(Continued)

(52) U.S. Cl.
CPC ............ *H02M 1/083* (2013.01); *H02M 1/44* (2013.01); *H02M 3/33523* (2013.01); *H02M 2001/0058* (2013.01)

(58) Field of Classification Search
CPC . H02M 2001/0058; H02M 2007/4815; H02M 1/083; H02M 3/335–42; Y02B 70/1416; Y02B 70/1433
(Continued)

(56) References Cited

U.S. PATENT DOCUMENTS

| 5,596,375 | A | * | 1/1997 | Kwon | ............... | H04N 5/59 |
| | | | | | | 348/687 |
| 2008/0049457 | A1 | * | 2/2008 | Choi | ............... | H02M 1/44 |
| | | | | | | 363/21.12 |
| 2016/0020699 | A1 | * | 1/2016 | Shen | ............... | H02M 1/44 |
| | | | | | | 363/15 |

FOREIGN PATENT DOCUMENTS

| DE | 10 2010 029 913 A1 | 12/2010 |
| WO | 2017 074305 A1 | 5/2017 |

OTHER PUBLICATIONS

Office action, application No. 10 2018 105 055.0, dated Nov. 15, 2018, p. 5.

\* cited by examiner

*Primary Examiner* — Thienvu V Tran
*Assistant Examiner* — Peter M Novak
(74) *Attorney, Agent, or Firm* — Armis IP Law, LLC (57) ABSTRACT

A controller (100) for a quasi-resonant (QR) flyback converter (200) having a switching element (210) operable at a switching frequency (F) is presented. The controller (100) is configured for repeatly: receiving, from the QR flyback converter (200), a controller input signal (ZC); determining a designated point of time at which the controller input signal (ZC) equals a threshold value (V_zcd), the designated point of time depending on a switching operation of the switching element (210); in response to determining the designated point of time, providing, to the QR flyback converter (200) and after a time delay, a controller output signal (G) for causing a further switching operation of the switching element (210); and modifying at least one of the threshold value (V_zcd) and the time delay (DT) by an amount, wherein modifying the at least one of the threshold value (V_zcd) and the time delay (DT) varies periodically, (Continued)

the period (TMF) of the modification period being the inverse of a modification frequency (MF).

25 Claims, 5 Drawing Sheets

(51) Int. Cl.
*H02M 1/44* (2007.01)
*H02M 1/00* (2006.01)

(58) Field of Classification Search
USPC .......................................... 363/21.02, 21.03
See application file for complete search history.

CONTROLLING A QR FLYBACK CONVERTER

TECHNICAL FIELD

This specification refers to embodiments of a controller for a QR flyback converter, to embodiments of a power converter having a QR flyback converter and a controller, and to embodiments of controlling a QR flyback converter.

RELATED APPLICATION

This application is related to and claims priority to earlier filed German patent application serial number 10 2018 105055.0 entitled "Controlling a QR Flyback Converter," (German attorney docket no. ITC173), filed on Mar. 6, 2018, the entire teachings of which are incorporated herein by this reference.

BACKGROUND

Many functions of modern devices in automotive, consumer and industrial applications, such as converting electrical energy and driving an electric motor or an electric machine, rely on power semiconductor devices. For example, Insulated Gate Bipolar Transistors (IGBTs), Metal Oxide Semiconductor Field Effect Transistors (MOSFETs) and diodes, to name a few, have been used for various applications including, but not limited to switches in power supplies and power converters.

For example, such power converter is a flyback converter, which typically employs a MOSFET as a switching element.

A flyback converter converts an input voltage into an output voltage and provides a galvanic isolation between these voltages by means of a transformer.

Known flyback converters can be divided into types based on the applied operation principle. A first type is based on a continuous conduction mode (CCM), wherein a primary winding of the transformer has a residual energy when the switching element is turned off. A second type is based on a Discontinuous Conduction Mode (DCM), wherein the primary winding has substantially no energy when the switching element is turned off.

The DCM type flyback converters can further be divided into two subgroups, namely fixed frequency DCM flyback converters and into variable frequency DCM flyback converters, the latter being also known as valley switching or Quasi Resonant (QR) flyback converters.

A QR flyback converter is a DCM flyback converter having a valley switching turn on. It is, e.g., used in low power switched-mode power supply applications such as in a charger, an adapter or an auxiliary supply.

SUMMARY

Embodiments herein are directed to QR flyback converters, specifically, to a control mechanism for a QR flyback converter or other suitable resource.

According to an embodiment, a controller for a QR flyback converter having a switching element operable at a switching frequency is presented. The controller is operable to (such as repeatedly, occasionally, etc.): receive, from the QR flyback converter, a controller input signal; determining a designated point of time at which the controller input signal equals a threshold value, the designated point of time depending on a switching operation of the switching element; in response to determining the designated point of time, providing, to the QR flyback converter and after a time delay, a controller output signal for causing a further switching operation of the switching element; and modify the threshold value, or the time delay by an amount, or modify a combination of both the threshold value and the time delay by an amount. In one embodiment, modification of the threshold value, the time delay, or both varies periodically, repeatedly, etc. A period of the modification period being the inverse of a modification frequency.

According to a further embodiment, a power converter comprises a QR flyback converter having a switching element operable at a switching frequency. The power converter further comprises a controller, the controller is operable to (such as repeatedly, occasionally, etc.): receive, from the QR flyback converter, a controller input signal; determining a designated point of time at which the controller input signal equals a threshold value, the designated point of time depending on a switching operation of the switching element; in response to determining the designated point of time, providing, to the QR flyback converter and after a time delay, a controller output signal for causing a further switching operation of the switching element; and modify the threshold value or the time delay by an amount, or modify both the threshold value and time delay, wherein modifying the at least one of the threshold value and/or the time delay varies periodically. In one embodiment, a period of the modification period being the inverse of a modification frequency.

According to a yet further embodiment, the current disclosure includes one or more methods of controlling a QR flyback converter having a switching element operable at a switching frequency. The method comprises carrying out, (such as repeatedly, occasionally, etc.), the following steps: receiving, from the QR flyback converter, a controller input signal; determining a designated point of time at which the controller input signal equals a threshold value, the designated point of time depending on a switching operation of the switching element; in response to determining the designated point of time, providing, to the QR flyback converter and after a time delay, a controller output signal for causing a further switching operation of the switching element; and modifying the threshold value, the time delay by an amount, or a combination of the threshold value and the time delay; wherein modifying the at least one of the threshold value and the time delay varies periodically. A period of the modification period being the inverse of a modification frequency.

Further embodiments herein include a power supply comprising: a quasi-resonant flyback converter; and a controller. The controller is operable to: receive an input signal from the quasi-resonant flyback converter; monitor a time in which the input signal crosses a threshold value; and variably adjust a period of activating a switch in the quasi-resonant flyback converter based on the time in which the input signal crosses the threshold value.

In accordance with further embodiments, the quasi-resonant flyback converter of the power supply includes a transformer; and the switch controls input of energy to a primary winding of the transformer to produce an output voltage.

In yet further embodiments, the controller is operable to adjust the period based on delaying activation of the switch with respect to the time in which the input signal crosses the threshold value. Additionally, or alternatively, the controller is operable to adjust the threshold value to vary the period. In accordance with further example embodiments, the adjustment to the period causes jitter with respect to the period and/or start or end time of activating the switch over multiple control cycles of activating the switch. In one embodiment, the adjustment to the period and/or start time or end time of activating the switch controls an electromagnetic interference attribute (such as reduces negative effects from EMI) of the quasi-resonant flyback converter and specifically the corresponding transformer or related components part of the resonant circuit.

Yet further embodiments include a method comprising: receiving an input signal from a quasi-resonant flyback converter; monitoring a time in which the input signal crosses a threshold value; and variably adjusting a period of activating a switch in the quasi-resonant flyback converter based on the time in which the input signal crosses the threshold value.

Those skilled in the art will recognize additional features and advantages upon reading the following detailed description, and upon viewing the accompanying drawings.

BRIEF DESCRIPTION OF THE DRAWINGS

The parts in the figures are not necessarily to scale, instead emphasis being placed upon illustrating principles of the invention. Moreover, in the figures, like reference numerals may designate corresponding parts. In the drawings.

DETAILED DESCRIPTION

In the following detailed description, reference is made to the accompanying drawings which form a part hereof and in which are shown by way of illustration specific embodiments in which the invention may be practiced.

In this regard, directional terminology, such as "top", "bottom", "below", "front", "behind", "back", "leading", "trailing", "above" etc., may be used with reference to the orientation of the figures being described. Because parts of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Reference will now be made in detail to various embodiments, one or more examples of which are illustrated in the figures. Each example is provided by way of explanation, and is not meant as a limitation of the invention. For example, features illustrated or described as part of one embodiment can be used on or in conjunction with other embodiments to yield yet a further embodiment. It is intended that the present invention includes such modifications and variations. The examples are described using specific language which should not be construed as limiting the scope of the appended claims. The drawings are not scaled and are for illustrative purposes only. For clarity, the same elements or manufacturing steps have been designated by the same references in the different drawings if not stated otherwise.

In the context of the present specification, the terms "in ohmic contact", "in electric contact", "in ohmic connection", and "electrically connected" intend to describe that there is a low ohmic electric connection or low ohmic current path between two regions, sections, zones, portions or parts of the device described herein. Further, in the context of the present specification, the term "in contact" intends to describe that there is a direct physical connection between two elements of the respective semiconductor device; e.g., a transition between two elements being in contact with each other may not include a further intermediate element or the like.

In addition, in the context of the present specification, the term "electric insulation" is used, if not stated otherwise, in the context of its general valid understanding and thus intends to describe that two or more components are positioned separately from each other and that there is no ohmic connection connecting those components. However, components being electrically insulated from each other may nevertheless be coupled to each other, for example mechanically coupled and/or capacitively coupled and/or inductively coupled. To give an example, two electrodes of a capacitor may be electrically insulated from each other and, at the same time, mechanically and capacitively coupled to each other, e.g., by means of an insulation, e.g., a dielectric.

Figure 4:
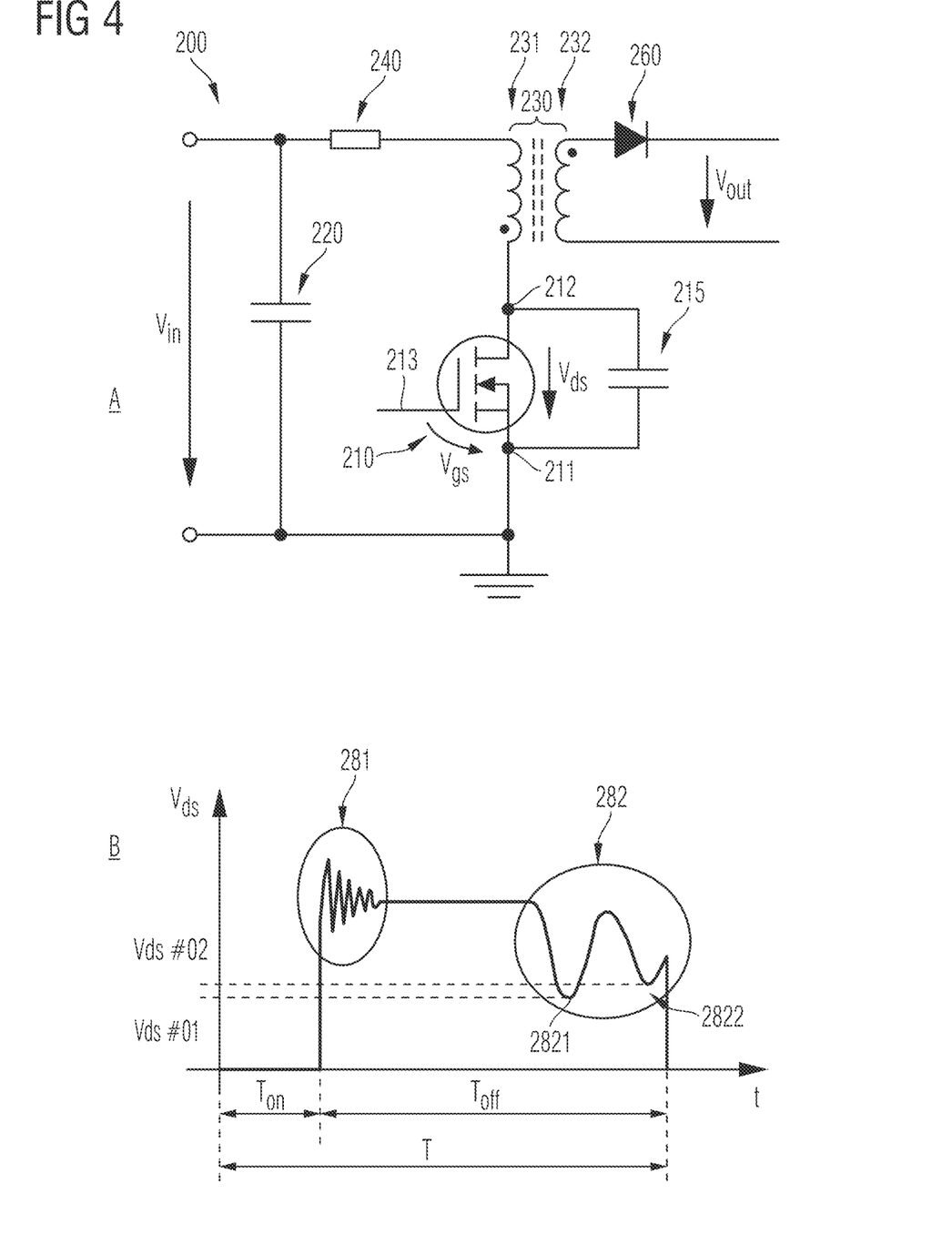
FIG. 4 schematically and exemplarily illustrates a QR flyback converter in accordance with one or more embodiments herein.

In section (A), FIG. 4 schematically and exemplary illustrates a basic circuit diagram of a QR flyback converter 200 in accordance with an embodiment. An input capacitor 220 provides an input voltage $V_{in}$, wherein the input voltage $V_{in}$ may be a DC voltage. Essentially by means of a transformer 230 and by means of operating a switching element 210, the input voltage $V_{in}$ may be converted into an output voltage $V_{out}$. The transformer 230 may have a primary winding 231 and a secondary winding 232 isolated from each other. A voltage at the secondary winding 232 may be rectified by diode 260.

The switching element may be MOSFET, and may comprise a gate terminal 213, a drain terminal 212 and a source terminal 211. For example, the switching element 210 is configured to be controlled based on a control voltage $V_{gs}$ applied between the gate terminal 213 and the source terminal 211. The switching frequency of the switching element 210 may be within the range of several kHz up to some MHz.

In section (A), FIG. 4 also shows the primary parasitic components of the QR flyback converter 200, namely a parasitic inductance 240 and a parasitic capacitance 215. The parasitic inductance 240 may include the leakage inductance of the transformer 230, while the parasitic capacitance 215 may include the total capacitance (e.g., $C_{oss}$+intra-winding capacitance+stray capacitance) at the drain terminal 212 of the switching element 210.

In section B of FIG. 4, an exemplary course of the voltage $V_{ds}$ at the switching element 210 is illustrated over time. Accordingly, the switching period T may be divided into an on period $T_{on}$ and an off period $T_{off}$. Within the on period $T_{on}$, the voltage $V_{ds}$ at the switching element 210 is substantially zero, assuming ideal conductivity of the switching element 210. During this on period $T_{on}$, energy of the input capacitor 220 is transferred into the primary winding 231.

When the switching element 210 is turned off, oscillations 281 and 282 of the voltage $V_{ds}$ may come into being. The first oscillation 281 occurs at the beginning of the off period $T_{off}$, and is substantially caused by the parasitic inductance 240 and the parasitic capacitor 215.

The second oscillation 282 may exhibit a substantially lower oscillation frequency as compared to the first oscillation 281, and the second oscillation 282 may occur when the current in the secondary winding 232 declines to zero. For example, the second oscillation 282 is caused by the inductivity of the transformer 230 and the parasitic capacitance 250.

As illustrated, the second oscillation 282 may exhibit one or more voltage level valleys 2821 and 2822, wherein each valley is associated with a respective minimum valley voltage $V_{ds\#01}$ and $V_{ds\#02}$.

By turning the switching element 210 on again at or in proximity to the point of time when one of the voltage valleys reaches its minimum voltage $V_{ds\#01}$ (or $V_{ds\#02}$), the flyback converter 200 is operated as a quasi-resonant flyback converter, herein referred to as QR flyback converter.

Depending on the control of the QR flyback converter 200, the switching element 210 can be turned on at different voltage level valleys of the voltage $V_{ds}$, e.g., during the first valley 2821, the second valley 2822 or another (not illustrated) valley, e.g., depending on the load to be supplied with the output voltage $V_{out}$.

Figure 5:
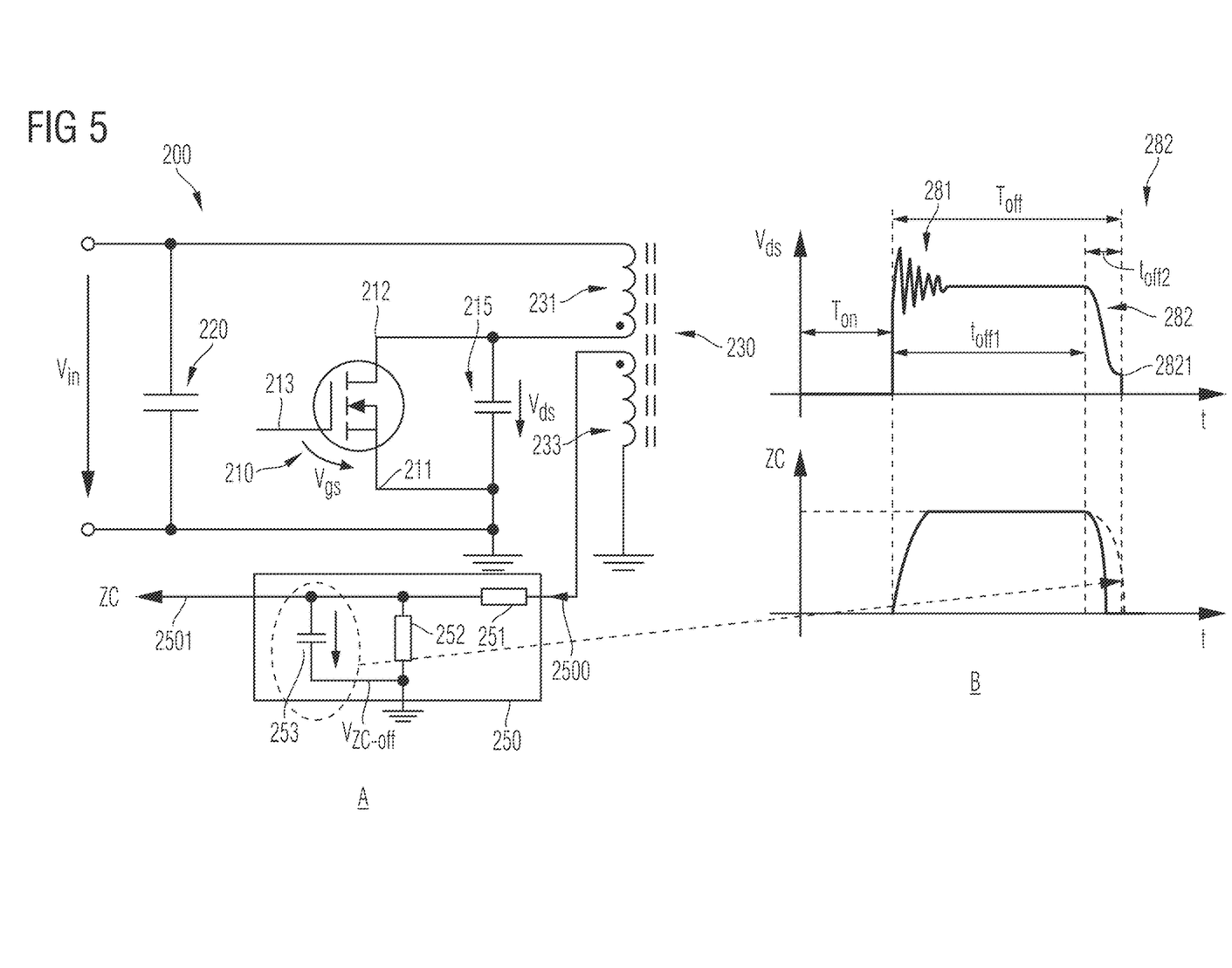
FIG. 5 schematically and exemplarily illustrates a QR flyback converter in accordance with one or more embodiments herein.

For detecting one or more of the one or more valleys 2821, 2822, a detector circuit 250 as schematically and exemplarily illustrated in FIG. 5 may be employed. Hence, an auxiliary winding 233 may be coupled to the transformer 230, e.g., at the primary side of the transformer 2030, for supplying an input detector signal 2500 to the detector circuit 250. The detector circuit 250 may exhibit an RC-configuration, e.g., comprising a first resistor 251, a second resistor 252 and a capacitor 253 connected in parallel to the second resistor 252.

The voltage at the capacitor 253 is referred to as $V_{ZC\_OFF}$, a course of which being schematically and exemplarily illustrated in the lower part of section B of FIG. 5. This voltage may be the output signal 2501 of the detector circuit 250, and the output signal may constitute a first controller input signal ZC for controlling the QR flyback converter 200. For example, such controller may be configured to turn on the switching element 210 once the controller determines that the controller input signal ZC reaches a certain threshold value (e.g., of zero) during the off period $T_{off}$.

As indicated in the upper part of section B of FIG. 5, the off period $T_{off}$ may be divided into the first off period $t_{off1}$ during which the first oscillation 281 occurs, and into the second off period $t_{off2}$, which is triggered with the beginning of the second oscillation 282, e.g., said decline of the voltage $V_{ds}$. Hence, the voltage $V_{ZC\_OFF}$ may reach the threshold value during the second off period $t_{off2}$.

The threshold value of the voltage $V_{ZC\_OFF}$ correlates with a designated point of time for a further switching operation of the switching element 210. E.g., the controller of the QR flyback converter 200 may detect that the voltage $V_{ZC\_OFF}$ has reached the threshold value, e.g., 0.1 V or 0 V, and may thereafter immediately, e.g., without delay, turn on the switching element 210.

The voltage $V_{ZC\_OFF}$ may be modified by varying the capacitance of the capacitor 253 and/or the resistance of the first resistor 251 and/or the resistance of the second resistor 252, as indicated by the dashed ellipse and arrow in FIG. 5. Thereby, the point of time of the turn on of the switching element 210 may be adjusted.

The main benefits of the QR flyback converter 200 are comparatively low turn on losses, since the QR flyback converter turns on the switching element 210 at or in proximity to the point of time of a minimum of one of the voltage level valleys 2821, 2822. A further benefit of the QR flyback converter 200 is a comparatively low electro-magnetic interference (EMI).

Aspects of the present specification relate to continuously modify the point of time when the switching element 210 is turned on again after the turn off period $T_{off}$. Thereby, the EMI characteristic of the QR flyback converter 200 can be further improved.

Figure 1:
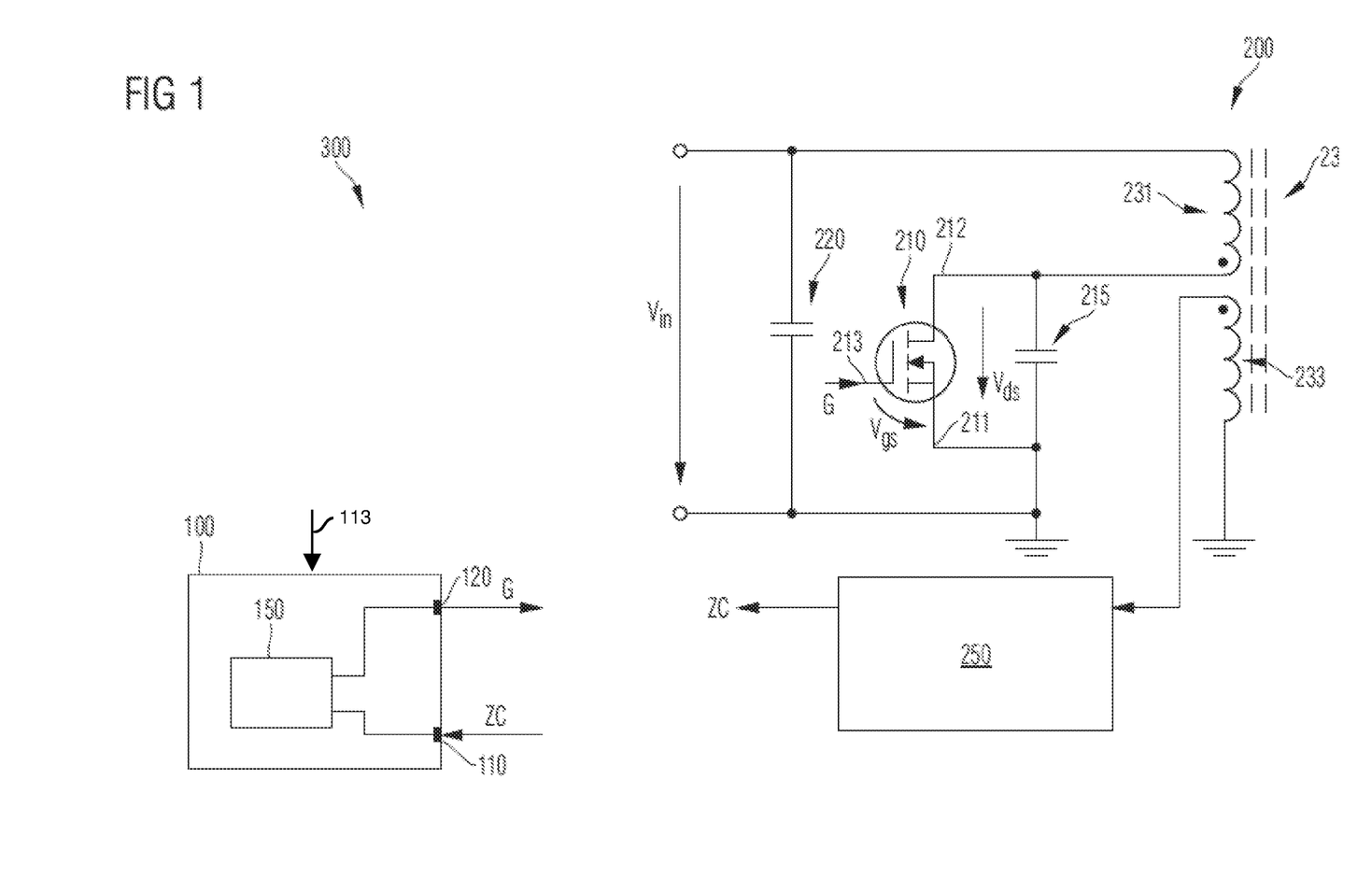
FIG. 1 schematically and exemplarily illustrates a power converter with a QR flyback converter and a controller in accordance with one or more embodiments herein.

FIG. 1 schematically and exemplarily illustrates a power converter 300 having a controller 100 and a QR flyback converter 200, e.g., in a configuration as has been explained above with respect to FIGS. 4 and 5.

The controller 100 is configured for receiving, from the QR flyback converter 200, a controller input signal ZC. As has just been explained, this controller input signal that ZC may be provided by a detector circuit 250, e.g., as said output voltage Vzc_off, wherein the detector circuit 250 may be configured as illustrated in FIG. 5.

The controller 100 is further configured for determining a designated point of time at which the controller input signal ZC equals a threshold value V_zcd (cf. FIG. 2, section B), the designated point of time depending on a switching operation of the switching element 210, e.g., a turn off operation of the switching element 210.

For example, for determining said designated point of the time, the controller 100 may comprise a digital processing unit 150, wherein the skilled person understands that the controller input signal ZC may be an analog signal that may be converted into a corresponding digital signal by corresponding (non-illustrated) analog-to-digital converter means.

Herein, the formulation "designated point of time" is chosen since this point of time may designate, e.g., define, a point of time for a further, namely the next switching operation of the switching element 210, in accordance with an embodiment.

Determining the designated point of time may include detecting that the controller input signal ZC has reached the threshold value V_zcd; e.g., at the designated point of time, the controller input signal ZC is equal to the threshold value V_zcd. For example, the threshold value V_zcd amounts to a value within the range of 0 to 1.5 V, wherein, as will become apparent from the description below, the controller 100 may be configured to modify the threshold value V_zcd.

The controller 100 may further be configured to provide, in response to determining the designated point of time, a controller output signal G to the QR flyback converter 200 for causing a further switching operation of the switching element 210, e.g., a turn on operation, wherein the controller output signal G is provided after a time delay. E.g., the time delay can be the delay between a) detecting that the controller input signal ZC has reached the threshold value V_zcd (e.g., detecting that the controller input signal ZC equals the threshold value V_zcd) and b) outputting the controller output signal G so as to turn on switching element 210.

In accordance with an embodiment, the controller 100 is further configured for modifying at least one of the threshold value V_zcd and the time delay by an amount. Modifying the at least one of the threshold value V_zcd and the time delay may vary periodically, wherein the period of the modification period is the inverse of a modification frequency. Thus, the controller 100 can be configured to repeatly, namely at the modification frequency, carry out the steps mentioned above.

Hence, it is proposed to slightly modify over time, namely at the modification frequency, at least one of the threshold value V_zcd and the time delay, to impose a jittering onto the point of time of the further switching operation, e.g., for improving the EMI characteristic of the QR flyback converter 200.

Some exemplary modification schemes will be explained further below with respect to FIGS. 2 and 3.

In accordance with an embodiment, modifying the at least one of the threshold value V_zcd and the time delay by an amount occurs by means of the digital processing unit 150. E.g., the modification of the threshold value and/or the time delay at the modification frequency does not occur passively, e.g., not by means of adjusting the value of the capacitance of the capacitor 253, and/or the resistance of the resistors 252 and 251 of the detector circuit 250. However, it shall be understood that the values of these passive components 251, 252, 253 or other components of the detector circuit 250 may nevertheless be adjusted in addition to digitally modifying the at least one of the threshold value and the time delay.

In more general terms, the modification frequency can be greater than 10 Hz, e.g., greater than 100 Hz or even greater than 1 kHz. For example, the modification frequency is at least twice as great as a voltage frequency at the input capacitor 220. For example, this voltage frequency may be caused by an AC power supply (not illustrated) which supplies an AC voltage that is rectified by one or more (non-illustrated) diodes and thereafter provided to the input capacitor 220 (also known as bulk capacitor).

However, the modification frequency must obviously not necessarily be greater than the switching frequency of the switching element 210. For example, the switching frequency of the switching element 210 is at least twice as great as the modification frequency. As has just been explained, the switching frequency may be a variable frequency, since it depends a) on the occurrence of the voltage level valleys 281 and 282 and b) on the modification of the at least one of the threshold value V_zcd and the time delay.

The threshold value V_zcd can be a voltage level value, e.g., a specific output voltage ZC of the detector circuit 250. Further, modifying the threshold value V_zcd may include a modification of the amount within the range of −3 V to 3 V. This modification may occur continuously over time, as will be explained in more detail with respect to FIG. 3.

In accordance with another embodiment, the time delay is a turn on delay, wherein modifying the time delay includes a modification of the amount within the range of 1 ns two 2000 ns. This modification may occur continuously over time, as will be explained in more detail with respect to FIG. 2. As explained above, the turn on delay may be the difference between the first point of time at which it is detected that the input controller signal ZC has reached (e.g., is equal to) the threshold value V_zcd and the second point of time at which the controller output signal G is output so as to turn on the switching element 210.

It shall be understood that, in accordance with one or more embodiments, within the modification, both the time delay and the threshold value V_zcd may be modified, and that in accordance with other embodiments, only one of the threshold value V_zcd and the time delay is modified. All three variants are possible. Further, during operation of the QR flyback converter 200, the modification schemes may alter, e.g., alter from modifying the threshold value V_zcd first, thereafter modifying the time delay, thereafter modifying both the time delay and the threshold value. Further, said modification may be entirely controlled by means of the digital processing unit 150.

Modifying the at least one of the threshold value and the time delay may vary periodically, wherein the period of the modification period is the inverse of the modification frequency, as will become apparent from the description below. The periodic variation may occur in accordance with a defined modification scheme. For example, such periodic variation may include an increase and a subsequent decrease of the threshold value V_zcd or, respectively, such modification scheme may include an increase and a subsequent decrease of the time delay within each period of the modification frequency. Said increase of the threshold value V_zcd or, respectively, the time delay, may be a linear increase, and said decrease of the threshold value or, respectively the time delay, may be a linear decrease.

In an embodiment, the controller 100 is configured to set the threshold value V_zcd to a fixed value and to modify only the time delay. In accordance with this embodiment, only the time delay is modified, and the threshold value V_zcd is kept constant, for example, the threshold value may amount to zero or substantially zero, e.g., to 0.1 V. In another embodiment, the time delay is constant, and only the threshold value V_zcd is modified.

The controller output signal G can be a switch signal for the switching element 210, and the controller 100 can be configured to alter the switching frequency based on the modifying of the at least one of the threshold value V_zcd and the time delay. For example, the controller output signal G may be a gate signal provided at the gate terminal 213 of the switching element 210. Hence, the controller 100 may be configured to act as a driver for the switching element 210, e.g., by outputting the controller output signal G as said control voltage $V_{gs}$. Alternatively, the controller output signal G may be provided to a driver subunit (not illustrated) that amplifies the controller output signal G before providing it to the gate terminal 213 of the switching element 210.

The controller 100 may comprise a first input terminal 110 for receiving the controller input signal ZC, and a first output terminal 120 for outputting the controller output signal G. For example, the first input terminal 110 may be electrically connected to an output terminal of the detector circuit 250. Further, the first output terminal 120 may be electrically connected to the control terminal 213 of the switching element 210. In another embodiment, the first output terminal 120 may be electrically connected to the control terminal 213 by means of a resistor with a defined resistance and/or by means of said driver subunit.

As has become apparent from the aforesaid, the threshold value V_zcd and the time delay may collectively define a point of time of the further switching operation of the switching element 210, e.g., the point of time of the next turn on of the switching element, in accordance with an embodiment. For example, the greater the time delay, the further the turn on operation of the switching element 210 is delayed. The modification of the threshold value V_zcd may also increase or decrease the delay of the turn on operation of the switching element 210.

The modification frequency can be a variable frequency, and the controller 100 may be configured to set the modification frequency. For example, if the controller 100 determines that a higher modification frequency yields an improved EMI, the modification frequency can correspondingly be increased. Vice versa, if it is indicated to the controller 100 or, respectively, if the controller 100 determines that a lower modification frequency might be more beneficial for the EMI, the modification frequency may correspondingly be reduced. For example, to this end, in an embodiment, the controller 100 may be configured to receive a further controller input signal 113 indicative of an EMI characteristic of the QR flyback converter 200. Thereupon, the controller 100 may be configured to set, based on the further controller input signal, at least one of the modification frequency, the threshold value modification and the time delay modification.

As illustrated above, modifying at the least one of the threshold value and the time delay may cause a jittering of the switching frequency of the switching element 210. Such jittering of the switching frequency may improve the EMI characteristic of the QR flyback converter 200.

Figure 2:
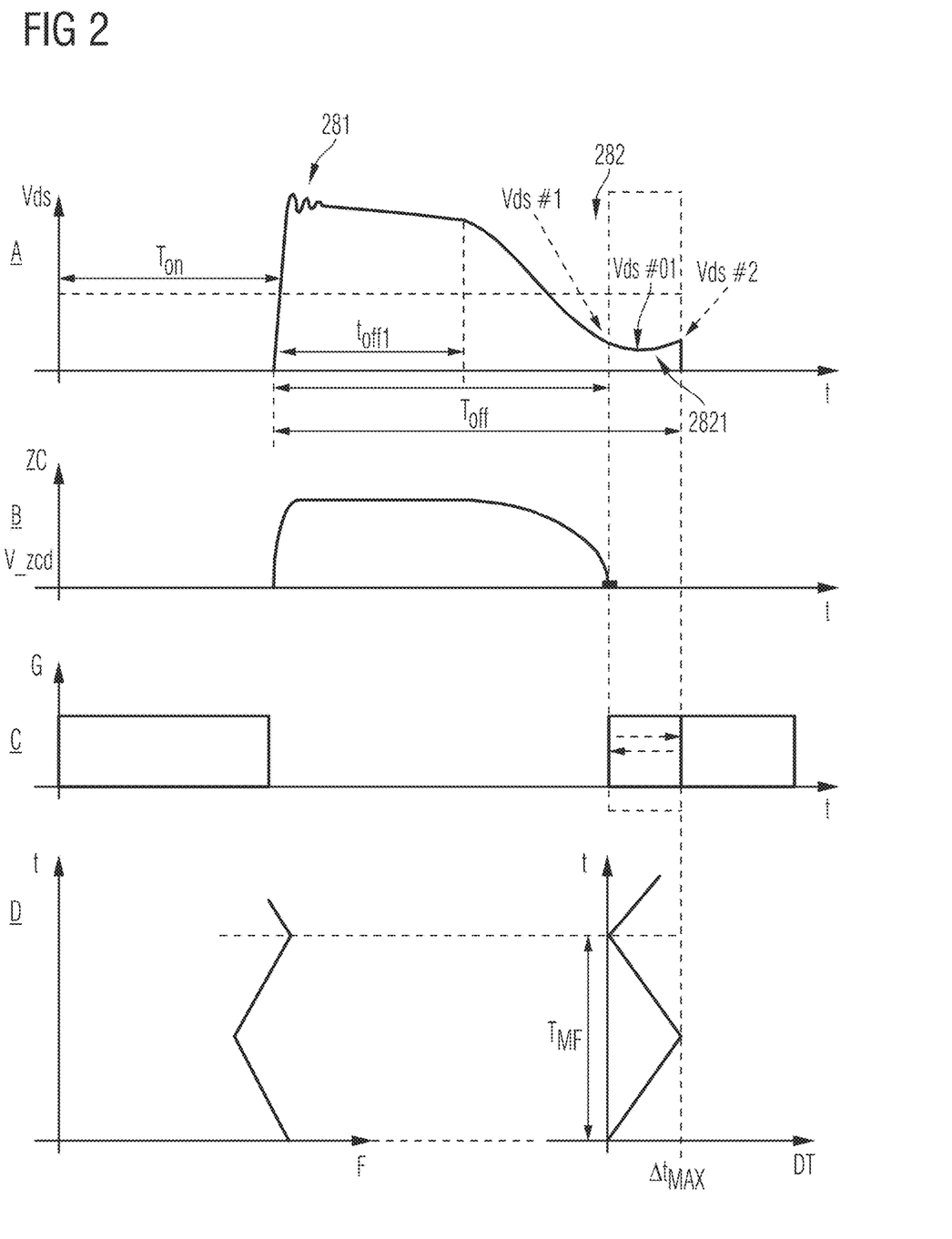
FIG. 2 schematically and exemplarily illustrates a first modification scheme in accordance with one or more embodiments herein.

With respect to FIG. 2, a first exemplary periodic variation of the at least one of the threshold value V_zcd and the time delay shall be explained. Herein, the periodic modification of the at least one of the threshold value V_zcd and the time delay is also referred to as "modification scheme".

Diagram A illustrates the voltage $V_{ds}$ over time that occurs at the parasitic capacitor 250, i.e., between the drain terminal 212 and the source terminal 211 of the switching element 210.

Diagram B illustrates the level (e.g., the amplitude) of the controller input signal ZC, which is output by the detector circuit 250, for example. As indicated above, this controller input signal ZC may depend on the switching operation of the switching element 210 that causes the illustrated course of the voltage $V_{ds}$. More particularly, the threshold value V_zcd of the controller input signal ZC may indicate when the further, e.g., the next switching operation of the switching element 210, e.g., a turn on operation, is to be induced. In the illustrated example, the threshold value V_zcd of the controller input signal ZC is set to a fixed value close to zero, e.g., to 0.1 V. As explained above, the controller input signal ZC may be the voltage V_zcd at the capacitor 253 of the detector circuit 250.

Diagram C illustrates the controller output signal G over time in a simplified manner, wherein, if G is high, the switching element 210 is turned on, and wherein the switching element 210 turned off when G is low.

As illustrated by the dashed horizontal arrows in diagram C, the point of time of turn on after the off period $T_{off}$ is continuously increased and subsequently decreased within each period $T_{MF}$ of the modification frequency MF.

In diagram D, the right section shows the modification of the time delay DT within one period $T_{MF}$ of the modification frequency MF, and, in the left section, the corresponding effect on the switching frequency F over time.

For example, at the beginning of the period $T_{MF}$ of the modification frequency, the time delay DT is zero, corresponding to a maximum of the switching frequency F. Then, the turn on operation of the switching element 210 is essentially caused once the controller input signal ZC reaches the threshold value V_zcd, which may correspond to point of time when the voltage $V_{ds}$ reaches value $V_{ds\#1}$ of the first voltage level valley 2821. For example, the time delay DT is then linearly increased for 2 ms, e.g., until it reaches a value of 400 ns. At this maximum value of the time delay DT, the switching frequency F has a minimum, as illustrated in the left section of diagram D. The point of time of turn on of the switching element 210 may occur at the point of time when the voltage $V_{ds}$ at the switching element 210 reaches value $V_{ds\#2}$ of the first voltage level valley 2821, which occurs after the minimum $V_{ds\#01}$. Thereafter, the time delay DT is decreased down to zero for the subsequent 2 ms of the period of the modification frequency MF, such that the switching frequency F correspondingly increases again to the maximum value.

As indicated above, the modification frequency MF (250 Hz in the example above) can be significantly lower than the switching frequency. The modification frequency can be, e.g., in the range of some 10 to some 100 Hz, wherein the switching frequency is typically within the range of several kHz up to some MHz. It shall be understood that the switching frequency of the switching element 210 can be entirely controlled by the controller output signal G; hence, the switching frequency of the switching element 210 can be the inverse of one period of the controller output signal G.

As has further been indicated above and as has been illustrated in more detail with respect to FIG. 2, the modification of the time delay DT may occur over time, e.g., continuously over time. Hence, the time delay DT may be continuously modified, e.g., by a continuous increase and a subsequent continuous decrease in each period $T_{MF}$ of the modification frequency MF.

In an embodiment, the time delay DT may be the difference in time between a first point of time when the input controller signal ZC reaches the threshold value V_zcd and a second point of time when the controller output signal G is output so as to turn on the switching element 210.

In the example illustrated in FIG. 2, the threshold value V_zcd has been fixed, e.g., fixed to a value occurring when a first voltage level value $V_{ds\#1}$ of the voltage level valley 2821 is reached by the voltage $V_{ds}$, the first voltage level value $V_{ds\#1}$ being greater than the minimum $V_{ds\#01}$ of the voltage level valley 2821 and occurring at a point of time before the point of time of the minimum $V_{ds\#01}$. Hence, the threshold value V_zcd can correspond to the first voltage level value $V_{ds\#1}$ that is greater than the minimum $V_{ds\#01}$ of the voltage valley 2821 of the voltage $V_{ds}$, wherein the threshold value V_zcd can be equal to the controller input signal ZC at a point of time before the voltage $V_{ds}$ is at the minimum ($V_{ds\#01}$, $V_{ds\#02}$)

For example, with respect to the modification of the time delay DT, such modification can be limited, in terms of magnitude, by means of defining a switching window by the first voltage level value $V_{ds\#1}$ and second voltage level value $V_{ds\#2}$ These voltage level values may be set to be close to the minimum $V_{ds\#01}$ of the voltage level valley 2821 so as to avoid too high switching losses during turn on of the switching element 210. Hence, it may be a provision of the first modification scheme that the turn on operation of the switching element 210 occurs in the switching window defined by first voltage level value $V_{ds\#1}$ and second voltage level value $V_{ds\#2}$. For example, first voltage level value $V_{ds\#1}$ and second voltage level value $V_{ds\#2}$ deviates from the minimum $V_{ds\#01}$ of the voltage level valley 2821 by more than 0.5 V.

Further, whereas the modification of the time delay DT has been explained with respect to the first voltage level valley 2821, it shall be understood that the same modification or a similar modification may be based on another voltage level valley of the second oscillation 282 of the voltage $V_{ds}$.

Also, it shall be understood the modification frequency MF may vary over time, and that the periodic variation of the time delay DT must not necessarily be symmetric within a respective modification period $T_{MF}$ (as illustrated in FIG. 2); for example, it is possible to increase the time delay DT over more than 50% of the modification period $T_{MF}$ and to decrease the time delay DT with the remaining less than 50% of the modification period $T_{MF}$ or vice versa.

Figure 3:
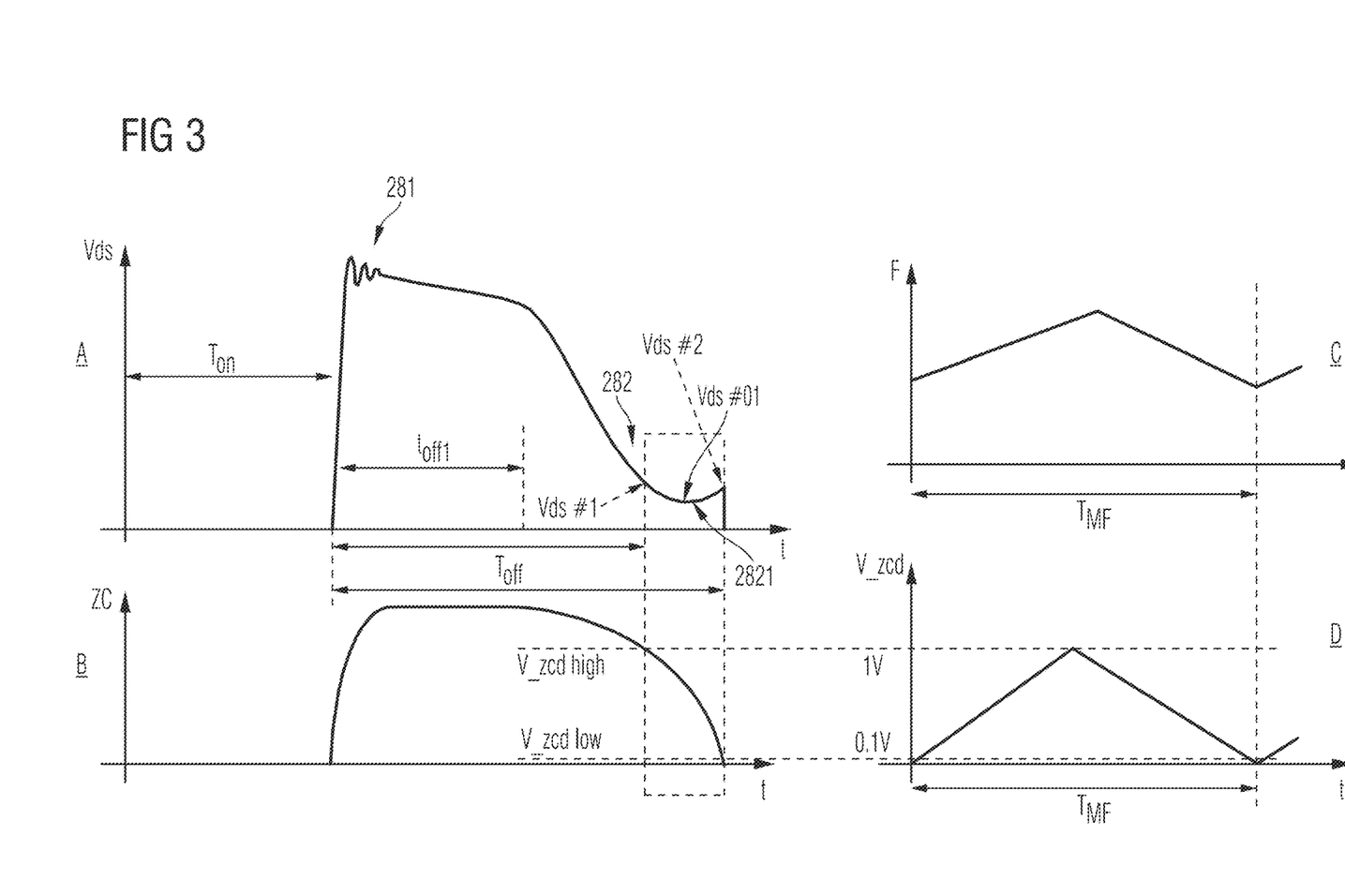
FIG. 3 schematically and exemplarily illustrates a second modification scheme in accordance with one or more embodiments herein.

With respect to FIG. 3, a second exemplary periodic modification shall be explained. In accordance with this embodiment, the time delay DT is kept constant, e.g., at DT is kept at substantially zero, such that, e.g., the controller output signal G is output (so as to turn on the switching element 210) immediately after the designated point of time when the controller input signal ZC is equal to the threshold value V_zcd has been determined. In accordance with this embodiment, the threshold value V_zcd is periodically modified between a maximum value V_zcd high and a minimum value V_zcd low.

In FIG. 3, diagrams A and B correspond to diagrams A and B of FIG. 2. For example, also with respect to the modification of the threshold value V_zcd, such modification can be limited, in terms of magnitude, by means of defining a switching window by the first voltage level value $V_{ds\#1}$ and second voltage level value $V_{ds\#2}$ These voltage level values may be set to be close to the minimum $V_{ds\#01}$ of the voltage level valley 2821 so as to avoid too high switching losses during turn on of the switching element 210. Hence, it may be a provision of the second modification scheme that the turn on operation of the switching element 210 occurs in the switching window defined by first voltage level value $V_{ds\#1}$ and second voltage level value $V_{ds\#2}$. For example, first voltage level value $V_{ds\#1}$ and second voltage level value $V_{ds\#2}$ deviates from the minimum $V_{ds\#01}$ of the voltage level valley 2821 by more than 0.5 V.

In diagram C of FIG. 3, the effect of the modification of the threshold value V_zcd on the switching frequency F is illustrated. For example, the minimum threshold value V_zcd low for the controller input signal ZC is set to 0.5 V. At this minimum value, the switching frequency F has its minimum, since this minimum threshold value is reached at a point of time after the first voltage level valley 2821 has reached its minimum $V_{ds\#01}$. The threshold value V_zcd is, e.g., continuously for 2 ms, increased up to the maximum V_zcd high, e.g., of 1 V. Since this maximum value V_zcd high is reached at an earlier point of time, the switching frequency F correspondingly increases and reaches also its maximum after the 2 ms. Thereafter, the threshold value V_zcd is decreased again down to its minimum V_zcd low, which decreases the switching frequency F accordingly.

Analogously to the embodiment of FIG. 2, also with respect to the embodiment of FIG. 3, it shall be understood the modification frequency MF may vary over time, and that the periodic variation of the threshold value V_zcd must not necessarily be symmetric within a respective modification period $T_{MF}$ (as illustrated in FIG. 3); for example, it is possible to increase the threshold value V_zcd over more than 50% of the modification period $T_{MF}$ and to decrease the threshold value V_zcd with the remaining less than 50% of the modification period $T_{MF}$ or vice versa.

Also, referring to both the threshold value V_zcd and the time delay DT, the modification may occur in other forms than just linearly (as illustrated in FIG. 2 and FIG. 3). For example, exponential, step-like or other forms of modification are also possible.

As has been shown above, modifying at least one of the threshold value and the time delay may impose a jittering on the switching frequency of the switching element of the QR flyback converter, which may positively influence the EMI characteristic of the QR flyback converter. As has been indicated above, both modification schemes, namely both the modification of the time delay and the modification of the threshold value, may be combined with each other.

However, in terms of practicability, it can be beneficial to keep the threshold value constant and to only modify the time delay, as has been explained with respect to FIG. 2.

Herein presented is also a method of controlling a QR flyback converter having a switching element operable at a switching frequency. The method comprises carrying out, repeatly, the following steps: receiving, from the QR flyback converter, a controller input signal; determining a designated point of time at which the controller input signal equals a threshold value, the designated point of time depending on a switching operation of the switching element; in response to determining the designated point of time, providing, to the QR flyback converter and after a time delay, a controller output signal for causing a further switching operation of the switching element; and modifying at least one of the threshold value and the time delay by an amount, wherein modifying the at least one of the threshold value and the time delay varies periodically, the period of the modification period being the inverse of a modification frequency.

Regarding exemplary embodiments the method of controlling the QR flyback converter, it is entirely referred to the above described embodiments of the controller 100. Hence, the optional features described with respect to the controller 100 and the optional features described with respect to the QR flyback converter 200 may analogously apply for forming embodiments of the control method.

Spatially relative terms such as "under", "below", "lower", "over", "upper" and the like, are used for ease of description to explain the positioning of one element relative to a second element. These terms are intended to encompass different orientations of the respective device in addition to different orientations than those depicted in the figures. Further, terms such as "first", "second", and the like, are also used to describe various elements, regions, sections, etc. and are also not intended to be limiting. Like terms refer to like elements throughout the description.

As used herein, the terms "having", "containing", "including", "comprising", "exhibiting" and the like are open ended terms that indicate the presence of stated elements or features, but do not preclude additional elements or features.

With the above range of variations and applications in mind, it should be understood that the present invention is not limited by the foregoing description, nor is it limited by the accompanying drawings. Instead, the present invention is limited only by the following claims and their legal equivalents.

The invention claimed is:

1. A controller for a quasi-resonant flyback converter having a switching element operable at a switching frequency, the controller operable to repeatedly: receive, from the quasi-resonant flyback converter, a controller input signal; determine a designated point of time at which the controller input signal equals a threshold value, the designated point of time depending on a switching operation of the switching element; in response to determining the designated point of time, providing, to the quasi-resonant flyback converter, a controller output signal operable to cause a further switching operation of the switching element; and modify the threshold value and modify a time delay by an amount; wherein modification of the threshold value and the time delay varies periodically, the period of the modification period being the inverse of a modification frequency, the threshold value being a variable threshold value; for each respective designated point in time in which the controller input signal equals the variable threshold value, activating the switching element in the quasi-resonant flyback converter, the activating of the switching element being based on the respective designated point in time in which the controller input signal crosses the variable threshold value; wherein the controller is further operative to implement a respective time delay between the respective designated point in time and activating the switching element, the respective time delay representing a time difference between the respective designated point in time and a start time of activating the switching element for a duration of time; and wherein variations in the variable threshold value results in variable time delay adjustments to the respective time delay in accordance with the modification frequency, the modification frequency indicating a rate at which a magnitude of the respective time delay varies over the multiple detected designated points in time.

2. The controller as in claim 1, wherein the modification frequency is greater than 10 Hz.

3. The controller as in claim 1, wherein the variable threshold value is a voltage level value, and wherein modification of the variable threshold value includes a modification of the amount within the range of −3 V to 3 V.

4. The controller as in claim 1, wherein the respective time delay is a turn on delay, and wherein modification of the respective time delay includes a modification of the amount within the range of 1 ns to 2000 ns.

5. The controller as in claim 1, wherein the modification includes both an increase and decrease of the variable threshold value and the respective time delay within each period of the modification frequency.

6. The controller as in claim 5, wherein the increase is a linear increase, and wherein the decrease is linear decrease.

7. The controller as in claim 1, wherein the controller is operable to set the variable threshold value to a fixed value and to modify only the respective time delay.

8. The controller as in claim 7, wherein the variable threshold value corresponds to a first voltage level value, the first voltage level value being greater than a minimum of one or more voltage valleys, and wherein the variable threshold value is equal to the controller input signal at a point of time before the voltage is at the minimum.

9. The controller as in claim 1, wherein the controller output signal is a switch signal for the switching element, and wherein the controller is operable to alter the switching frequency based on the modifying of the variable threshold value and the respective time delay.

10. The controller as in claim 1, wherein the further switching operation is a turn on operation.

11. The controller as in claim 10, wherein the variable threshold value and the respective time delay collectively define a point of time of the turn on operation.

12. The controller as in claim 1, wherein the modification frequency is a variable frequency, and wherein the controller is operable to set the modification frequency.

13. The controller as in claim 1, wherein the controller is further operable to: receive a further controller input signal indicative of an electro-magnetic interference characteristic of the quasi-resonant flyback converter; set, based on the further controller input signal, at least one of the modification frequency, the variable threshold value and the respective time delay.

14. The controller as in claim 1, wherein modifying at least one of the variable threshold value and the respective time delay causes a jittering of the switching frequency.

15. A method of controlling a quasi-resonant flyback converter having a switching element operable at a switching frequency, the method comprising: carrying out, repeatedly, operations of: receiving, from the quasi-resonant flyback converter, a controller input signal; determining a designated point of time at which the controller input signal equals a threshold value, the designated point of time depending on a switching operation of the switching element; in response to determining the designated point of time, providing, to the quasi-resonant flyback converter and after a time delay, a controller output signal for causing a further switching operation of the switching element; and modifying the threshold value and modifying the time delay by an amount; wherein modifying the threshold value and the time delay varies periodically, the period of the modification period being the inverse of a modification frequency, the threshold value being a variable threshold value; for each respective designated point in which the controller input signal equals the variable threshold value, activating the switching element in the quasi-resonant flyback converter, the activating of the switching element being based on the respective designated point in time in which the controller input signal crosses the variable threshold value; wherein the controller is further operative to implement a time delay between the respective designated point in time and activating the switching element, the respective time delay representing a time difference between the respective designated point in time and a start time of activating the switching element for a duration of time; and wherein variations in the variable threshold value results in variable time delay adjustments to the respective time delay in accordance with the modification frequency, the modification frequency indicating a rate at which a magnitude of the respective time delay varies over the multiple detected instants in time.

16. A power supply comprising: a quasi-resonant flyback converter; and a controller, the controller operable to: receive an input signal from the quasi-resonant flyback converter; detect instants in time in which the input signal crosses a variable threshold value; for each respective instant of time of the detected instants of time, activating a switch element in the quasi-resonant flyback converter, the activating of the switch element being based on the respective instant in time in which the input signal crosses the variable threshold value; wherein the controller is further operative to implement a time delay between the respective instant in time and activating the switch element, the respective time delay representing a time difference between the respective instant in time and a start time of activating the switch element for a duration of time; and wherein variations in the variable threshold value results in variable time delay adjustments to the respective time delay in accordance with a modification frequency, the modification frequency indicating a rate at which a magnitude of the respective time delay varies over the multiple detected instants in time.

17. The power supply as in claim 16, wherein the variations in the variable threshold value impose a jitter to a respective switching frequency of activating the switch element.

18. The power supply as in claim 17, wherein the jitter in the respective switching frequency of activating the switch element reduces electromagnetic interference caused by the quasi-resonant flyback converter.

19. The power supply as in claim 16, wherein the controller is further operative to: vary a setting of a resistor-capacitor filter circuit receiving the input signal from the quasi-resonant flyback converter, variations in the setting of the resistor-capacitor filter causing variations in the instants of time in which the input signal crosses the variable threshold value.

20. The power supply as in claim 16, wherein the controller includes a detector operative to detect the instants in time in which the input signal crosses the variable threshold value, the controller operative to vary a magnitude of the variable threshold value over time.

21. The power supply as in claim 20, wherein the controller is further operative to: vary a magnitude of the variable threshold value, variations in the magnitude of the variable threshold value varying in accordance with the modification frequency.

22. The power supply as in claim 21, wherein implementation of the modification frequency imposes a jitter to a respective switching frequency of activating the switch element.

23. The power supply as in claim 22, wherein the jitter in the respective switching frequency of activating the switch element reduces electromagnetic interference caused by the quasi-resonant flyback converter.

24. The power supply as in claim 16, wherein the controller is operative to vary a magnitude of the variable threshold value within a predetermined range.

25. The power supply as in claim 24, wherein the varied magnitude of the variable threshold value within the predetermined range over multiple cycles of activating the switch element imposes a jitter to a respective switching frequency of activating the switch element.

* * * * *